United States Patent [19]

Minowa et al.

[11] 4,108,879

[45] Aug. 22, 1978

[54] HARD BUTTER

[75] Inventors: Seigi Minowa; Yasuo Toyoshima; Nozomi Yasuda; Toshiro Tanaka, all of Tokyo, Japan

[73] Assignee: Asahi Denka Kogyo K.K., Tokyo, Japan

[21] Appl. No.: 789,770

[22] Filed: Apr. 22, 1977

[30] Foreign Application Priority Data

Jan. 20, 1977 [GB] United Kingdom ............... 2225/77

[51] Int. Cl.$^2$ ........................... C09F 7/08; C11C 3/14
[52] U.S. Cl. ............................ 260/405.6; 260/409; 260/410.7; 426/606; 426/607
[58] Field of Search ................. 260/409.6, 409, 410.7; 426/606, 607

[56] References Cited

U.S. PATENT DOCUMENTS

| | | | |
|---|---|---|---|
| 2,667,418 | 1/1954 | Barsky et al. | 260/410.7 X |
| 2,726,158 | 12/1955 | Cachran et al. | 260/410.7 X |
| 2,898,211 | 8/1959 | Barsky et al. | 260/410.7 X |
| 2,975,060 | 3/1961 | Best et al. | 426/607 |
| 2,996,388 | 8/1961 | Lindsay | 426/607 |
| 3,133,819 | 5/1964 | Gooding | 426/607 |
| 3,353,964 | 11/1967 | Seiden | 426/607 |
| 3,361,568 | 1/1968 | Kidger | 260/410.7 X |
| 3,396,037 | 8/1968 | Bell | 426/607 |
| 3,431,116 | 3/1969 | Feuge et al. | 260/410.7 X |
| 3,949,105 | 4/1976 | Wieske et al. | 426/607 |

Primary Examiner—Winston A. Douglas
Assistant Examiner—John F. Niebling
Attorney, Agent, or Firm—Blanchard, Flynn, Thiel, Boutell & Tanis

[57] ABSTRACT

A hard butter is prepared from a selective hydrogenation-isomerization product of a palm olein and a vegetable oil or fat other than palm oil.

9 Claims, 5 Drawing Figures

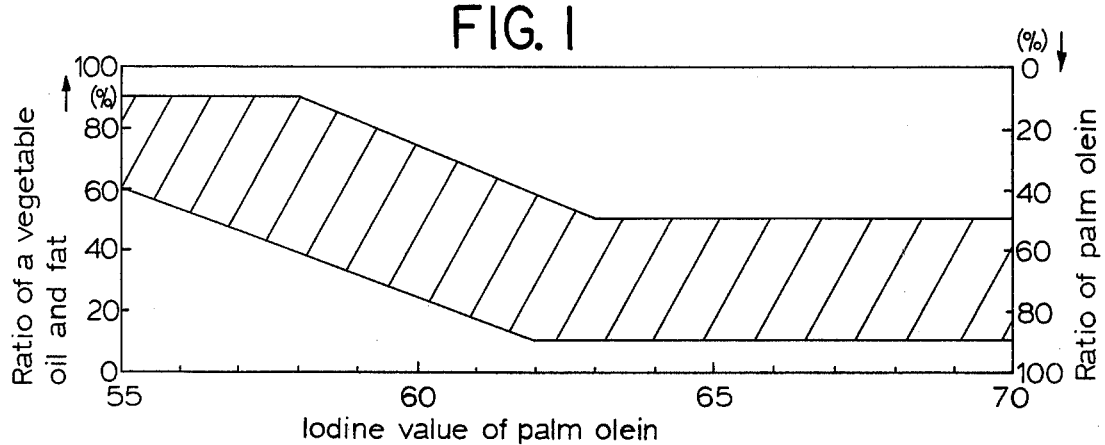
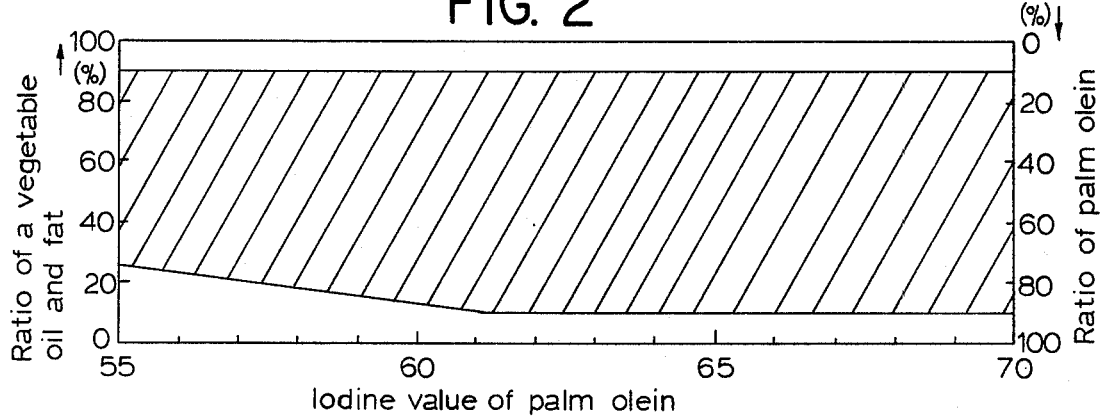
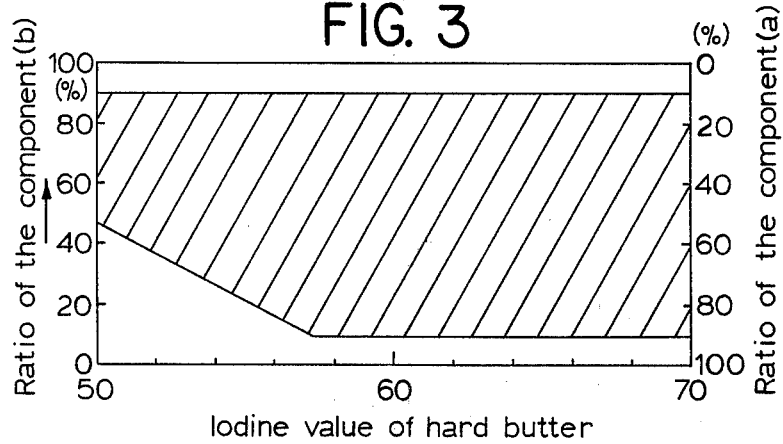

HARD BUTTER

BACKGROUND OF THE INVENTION

1. FIELD OF THE INVENTION

The present invention relates to hard butter prepared by using a vegetable oil or fat as the raw material.

More particularly, the present invention relates to a hard butter prepared from a selective hydrogenation-isomerization product of a palm olein and a vegetable oil or fat other than palm oil. The term "palm olein" used herein is intended to denote the fraction obtained by removing higher melting components such as tri-saturated glycerides from palm oil by fractionation.

2. DESCRIPTION OF PRIOR ARTS

As the conventional process for preparing a hard butter by merely hydrogenating a palm olein, there can be mentioned a process disclosed in the laid-open specification of Japanese patent application No. 96760/73. A hard butter obtained by merely hydrogenating a palm olein is defective in that it lacks a good mouth-melting property inherent in ordinary hard butters and since large quantities of solid fats are left unmolten at temperatures higher than the body temperature, when this butter is put into the mouth, it gives an unpleasant touch or feel resembling that of wax. The phenomenon that solid fats are left unmolten at temperatures higher than the body temperature is not desirable for hard butters. The reason why a product obtained by merely hydrogenating a palm olein is inferior in the mouth-melting property is that since the contents of unsaturated acids, especially polyene-acids, based on the total constituent fatty acids in the palm olein are low and the contents of saturated acids are as high as 30 to 45% by weight as a whole, tri-saturated glycerides are formed by hydrogenation, and high-melting-point glycerides are formed by trans-isomerization of unsaturated acids.

The specification of U.S. Pat. No. 3,199,984 discloses a process for preparing a hard butter by hydrogenating a vegetable oil or fat other than palm oil, and the specification of British Pat. No. 1,214,321 discloses a process for preparing a hard butter by hydrogenating a vegetable oil or fat and fractionating the resulting hydrogenation product. When hard butters prepared according to these known processes are used for preparation of chocolates, since they are insufficient in their compatibility with cacao butter, a drastic decrease of the melting point is caused when they are mixed with cacao butter, resulting in insufficient hardness and insufficient heat resistance. Moreover, blooming is often caused depending on the kind of the starting oil or fat.

SUMMARY OF THE INVENTION

We carried out research work with a view to overcoming the foregoing defects of hard butters prepared according to the conventional processes and found that a specific hard butter prepared from a palm olein substantially free of tri-saturated glycerides and a vegetable oil or fat having a linoleic acid content of 30 to 55% by weight based on the total constituent fatty acids and being substantially free of tri-saturated glycerides has a sharp mouth-melting property and has a good compatibility with cacao butter. We have now completed the present invention based on this finding.

As pointed out hereinbefore, since a palm soft oil has a low polyene-acid content and a high saturated acid content, when it is hydrogenated, tri-saturated glycerides are formed to degrade the mouth-melting property which is an important characteristic for a hard butter. Among the constituent fatty acids of the palm olein, palmitic acid is important in connection with the form-retaining property, heat resistance and compatibility with cacao butter and the presence of palmitic acid is preferred for a hard butter. In the present invention, such characteristic properties of the palm olein are fully utilized and defects often observed in other vegetable oils and fats, such as insufficient compatibility, insufficient hardness and insufficient heat resistance, are overcome by incorporating a palm olein having such characteristics into other vegetable oils and fats.

Palmitic acid, one of the constituent fatty acids of an oil or fat, is important in connection with the form-retaining property, heat resistance and compatibility with cacao butter, and a palm olein, which contains palmitic acid in a considerable amount, is preferred as a raw material of a hard butter.

In general, the mouth-melting property of vegetable oils and fats is greatly influenced by selective hydrogenation-isomerization conditions. As hydrogenation conditions, there can be mentioned the kind of the catalyst, the amount thereof, the hydrogenation temperature and the hydrogen pressure. In general, hydrogenation is carried out by setting these conditions appropriately. Still further, the kind and composition of the starting oil or fat have great influence on the mouth-melting property of the product. Therefore, it is very important to select a starting oil or fat appropriately.

As a result of our research work, it was found that a vegetable oil or fat substantially free of tri-saturated glycerides and having a linoleic acid content of 30 to 55% by weight based on the total constituent fatty acids is preferred as the starting oil or fat. In short, according to the present invention, a high quality hard butter is obtained by using the above-mentioned palm olein and vegetable oil or fat as starting materials and subjecting them to selective hydrogenation-isomerization and optionally to fractionation.

More specifically, in accordance with the present invention, there is provided a hard butter consisting essentially of (a) 10 to 90% by weight of an hardened oil obtained by hydrogenating with isomerizing a palm olein substantially free of a tri-saturated glyceride and/or a fraction obtained by fractionating the hardened oil and (b) 90 to 10% by weight of a hardened oil obtained by hydrogenating with isomerizing a vegetable oil or fat substantially free of tri-saturated glycerides and having a linoleic acid content of 30 to 55% by weight based on the total constituent fatty acids and/or a fraction obtained by fractionating the hardened oil, wherein the iodine value is 50 to 75, the trans-isomer content is at least 25% by weight, the palmitic acid content is 15 to 40% by weight based on the total constituent fatty acids, the stearic acid content is 2 to 10% by weight based on the total constituent fatty acids and the oleic acid content is 55 to 75% by weight based on the total constituent fatty acids.

BRIEF DESCRIPTION OF DRAWINGS

FIGS. 1 to 3 are diagrams illustrating suitable mixing ratios of the components (a) and (b) in the present invention.

DETAILED DESCRIPTION OF THE INVENTION

Figure 4:
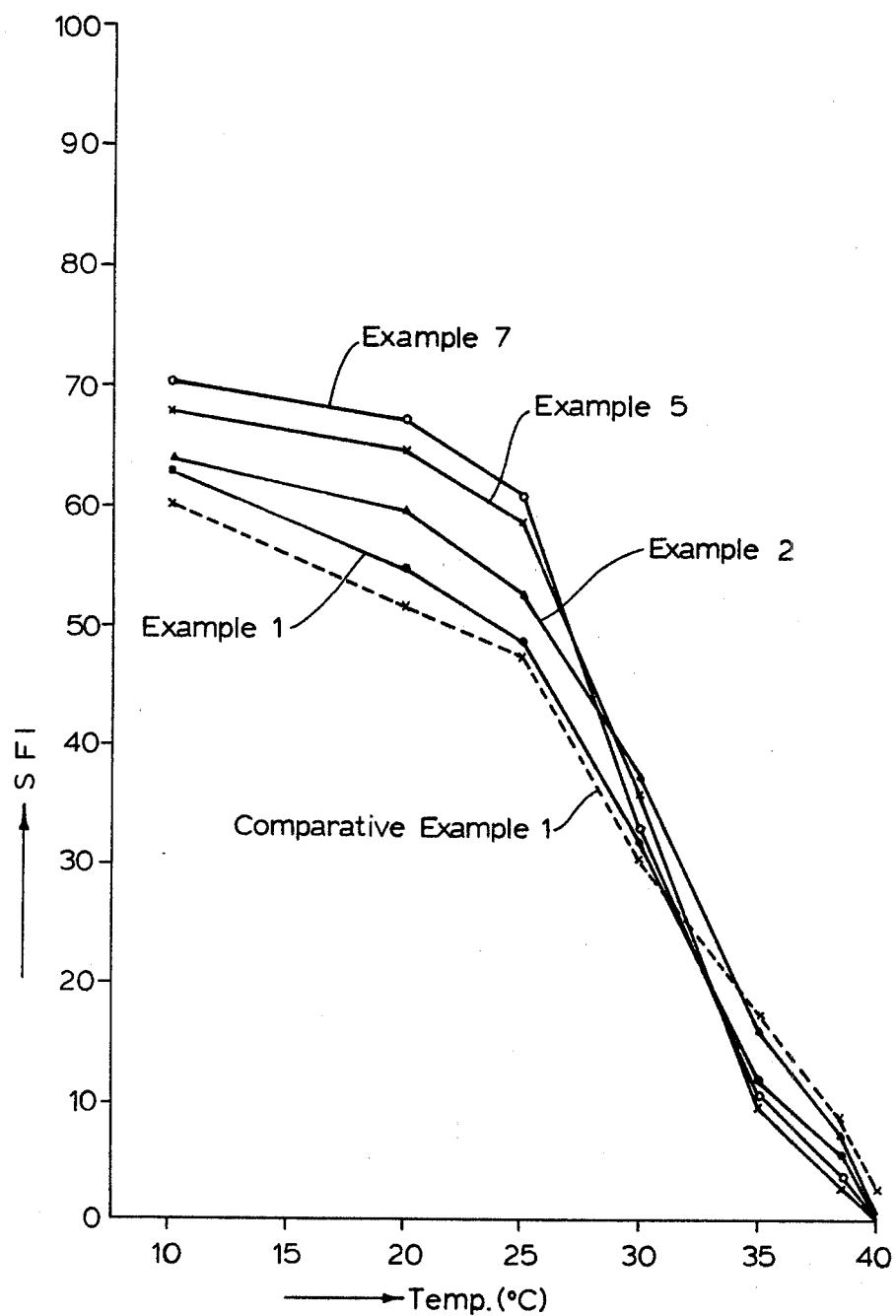
FIGS. 4 and 5 illustrate solid fat content curves of hard butters prepared in Examples of the present invention and Comparative Examples given below.

In accordance with a preferred embodiment of the present invention, there is provided a hard butter consisting essentially of an oil or fat having an iodine value of 55 to 70, a trans-isomer content of at least 35% by weight, a palmitic acid content of 15 to 40% by weight based on the total constituent fatty acids, a stearic acid content of 2 to 10% based on the total constituent fatty acids and an oleic acid content of 55 to 75% by weight based on the total constituent fatty acids, said oil or fat being obtained by selectively hydrogenating with isomerizing a composition formed by mixing the above-mentioned palm olein and the above-mentioned vegetable oil or fat at a mixing ratio in the range specified in FIG. 1.

This hard butter can be obtained only by hydrogenation-isomerization. Accordingly, the process steps can be simplified and the manufacturing cost can be reduced.

In order to obtain a hard butter having a good compatibility with cacao butter, a better mouth-melting property and a suitable shrinkability, it is preferred to remove low-melting-point or high-melting point components from hydrogenated isomerized oil by fractionation after hydrogenation-isomerization. According to this invention, such preferred hard butter is prepared by mixing the above-mentioned palm olein and the above-mentioned vegetable oil or fat at a mixing ratio in the range specified in FIG. 2 selectively hydrogenating with isomerizing the resulting oil composition and then fractionating the resulting hydrogenated isomerized oil.

As pointed out hereinbefore, in order to obtain a cheap hard butter, it is preferred to perform hydrogenation-isomerization alone. However, tri-saturated glycerides degrading the mouth-melting property of the resulting hard butter are readily formed when hydrogenation-isomerization alone is conducted. In order to obviate formation of undesirable tri-saturated glycerides, it is necessary to control severely the hydrogenation-isomerization conditions and even if the hydrogenation-isomerization conditions are severely controlled, reduction of the quality cannot be avoided unless the starting materials are strictly chosen. According to this invention, a high quality butter moderating the fore-going defects is provided by mixing (a) hardened oil obtained by hydrogenating with isomerizing the above-mentioned palm olein and (b) an oil or fat obtained by selectively hydrogenating with isomerizing the above-mentioned vegetable oil or fat at a mixing ratio in the range specified in FIG. 3, and fractionating the resulting mixture.

This hard butter of the present invention has an iodine value of 50 to 70, a trans-isomer content of at least 25% by weight, a palmitic acid content of 20 to 40% by weight based on the total constituent fatty acids, a stearic acid content of 2 to 10% by weight based on the total constituent fatty acids and an oleic acid content of 55 to 70% by weight based on the total constituent fatty acids.

The palm olein that is used as the raw material of the component (a) in the present invention has an iodine value (IV) of at least 55 and is substantially free of tri-saturated glycerides. As such palm olein there can be mentioned a palm olein obtained by solvent fractionation as disclosed in Japanese patent publication No. 39822/74, a palm olein prepared by the wintering method, and a palm olein prepared by fractionation using a surface active agent, as disclosed in Japanese patent publication No. 9986/56.

As the raw material of the component (b) of the hard butter of the present invention, a vegetable oil or fat having a linoleic acid content of 30 to 55% by weight based on the total constituent fatty acids and being substantially free of tri-saturated glycerides is employed. As preferred examples of such vegetable oil or fat, there can be mentioned rice bran oil, cotton seed oil, sunflower oil, soybean oil and corn oil. They are used singly or in the form of a mixture of two or more of them.

It is indispensable that the hard butter of the present invention should have an iodine value of 50 to 75 and a trans-isomer content of at least 25% by weight. In the present invention, hydrogenation-isomerization conditions and fractionation conditions must be chosen and adjusted so that the resulting product has the above-mentioned iodine value and trans-isomer content.

As the hydrogenation-isomerization for obtaining the hard butter of the present invention, selective hydrogenation may be performed in the presence of a nickel catalyst or a poisoned nickel catalyst so that the trans-type fatty acid content is at least 25% by weight. As the hydrogenation catalyst, there can be used any of known catalysts customarily used in this field, so far as the intended objects of the present invention can be effectively attained. The amount of the catalyst used is not particularly critical but may be changed appropriately. In general, it is preferred that the catalyst be used in an amount of 0.1 to 2% by weight based on the oil or fat components. Hydrogenation conditions are chosen and set so that isomerization is promoted and hydrogenation is effected selectively. For example, it is preferred to conduct the hydrogenation at a temperature of 160° to 220° C. under a hydrogen pressure of 0 to 3 Kg/cm$^2$.

Fractionation may be performed according to, for example, the method using a solvent, such as disclosed in Japanese patent publication No. 39882/74, the wintering method or the method using a surface active agent, such as disclosed in Japanese patent publication No. 9986/56.

In the production of the hard butter of the present invention, an appropriate preparation process can be chosen among the foregoing various preparation processes depending on the use of the hard butter, the desired manufacturing cost, the manufacturing equipment and the like. For example, when it is intended to produce a high-grade product having a very sharp mouth-melting property, fractionated oils are chosen as both the components (a) and (b), and if it is intended to produce a cheap hard butter, hydrogenated isomerized oils are chosen as both the components (a) and (b).

The hard butter of the present invention has an excellent melting property and a good compatibility with cacao butter, and it is an excellent hard butter.

The hard butter set forth above with reference to FIG. 1 is cheap because it is prepared by hydrogenation-isomerization alone and the equipment expenses can be saved.

The hard butter set forth above with reference to FIG. 2 has a sharp mouth-melting property, a good shrinkability and a good compatibility with cacao butter.

The hard butter set forth above with reference to FIG. 3 is relatively cheap and has a sharp mouth-melting property, and it also is advantageous that the deviation of the quality can be remarkably reduced.

The present invention will now be described by reference to the following Examples that by no means limit the scope of the invention.

EXAMPLE 1

A mixture comprising 40% by weight of a palm olein having an iodine value of 58.3 and 60% by weight of cotton seed oil having an iodine value of 116.0 was subjected to selective hydrogenation-isomerization in the presence of 0.3% by weight of a spent nickel catalyst which had been used for hardening fish oil, at a temperature of 200° to 210° C. under a hydrogen pressure of 1.0 Kg/cm$^2$ to obtain a hardened oil having the following characteristics:

Iodine value: 63.6
Trans-isomer content: 50.6% by weight
Melting point: 37.0° C.
Fatty acid contents based on total constituent fatty acids:
Palmitic acid: 23.8% by weight
Stearic acid: 9.3% by weight
Oleic acid: 58.7% by weight This hardened oil was found to have a solid fat index curve (hereinafter referred to as "SFI curve") as shown in FIG. 4. The oil had an excellent melting property and exhibited a good compatibility with cacao butter in the compatibility test illustrated in the Referential Example given hereinafter.

EXAMPLE 2

A mixture comprising 15% by weight of the same cotton seed oil as used in Example 1 and 85% by weight of a palm olein having an iodine value of 63.8 was subjected to selective hydrogenation-isomerization in the presence of 0.5% by weight of a sulfur-poisoned nickel catalyst (having a sulfur content of 7% by weight based on nickel) at a temperature of 200° to 210° C. under a hydrogen pressure of 1.0 Kg/cm$^2$ to obtain a hardened oil having the following characteristics:

Iodine value: 55.8
Trans-isomer content: 52.5% by weight
Melting point: 37.2° C.
Fatty acid contents based on total constituent fatty acids:
Palmitic acid: 35.6% by weight
Stearic acid: 2.3% by weight
Oleic acid: 56.2% by weight The hardened oil was found to have an SFI curve as shown in FIG. 4. It had an excellent melting property and exhibited a good compatibility with cacao butter in compatibility test illustrated in Referential Example given hereinafter.

EXAMPLE 3

Figure 5:
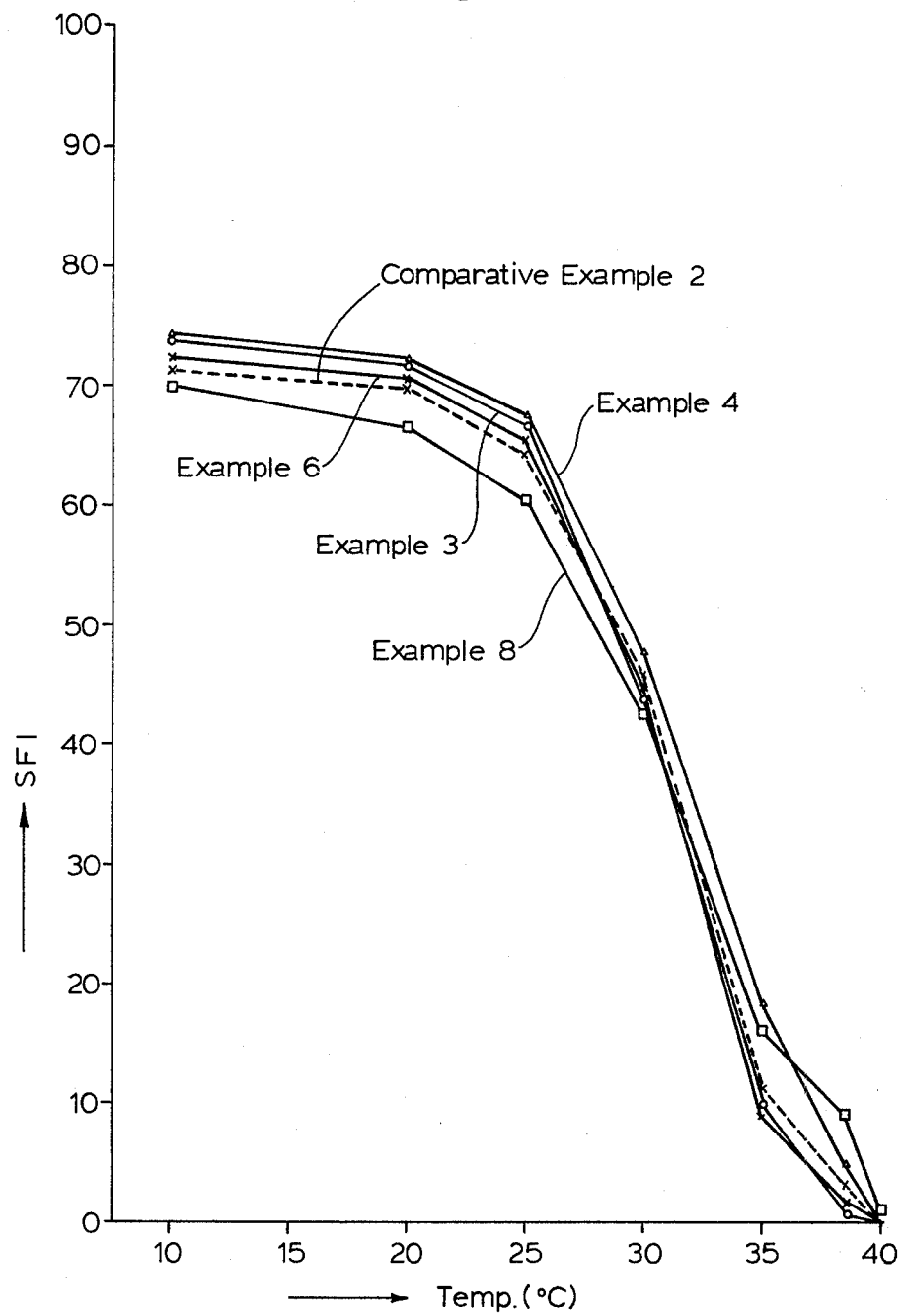

A mixture comprising 50% by weight of the same palm olein as used in Example 1 and 50% by weight of soybean oil having an iodine value of 129.5 was subjected to selective hydrogenation-isomerization in the presence of 0.5% by weight of the same spent nickel catalyst as used in Example 1 at a temperature of 200° to 210° C. under a hydrogen pressure of 1.0 Kg/cm$^2$ to obtain a hardened oil having an iodine value of 66.3, a trans-isomer content of 47.5% by weight and a melting point of 33.1° C. To 1 part by weight of the so obtained hardened oil was added 3 parts by weight of acetone, and crystallization was effected at 20° C. The filtrate portion was recovered by fractionation and then crystallized at 0° C. The filtrate portion was removed by fractionation and the solvent was removed from the residual crystal portion to obtain a fractionated oil having the following characteristics:

Iodine value: 59.0
Trans-isomer content: 46.2% by weight
Melting point: 34.7° C.
Fatty acid contents based on total constituent fatty acids:
Palmitic acid: 25.4% by weight
Stearic acid: 4.5% by weight
Oleic acid: 61.7% by weight The hard butter so obtained was found to have an SFI curve as shown in FIG. 5. The hard butter had an excellent melting property and exhibited a good compatibility with cacao butter in the compatibility test illustrated hereinafter.

EXAMPLE 4

A mixture comprising 70% by weight of the same palm olein as used in Example 1 and 30% by weight of rice bran oil having an iodine value of 104.5 was subjected to selective hydrogenation-isomerization in the presence of 0.5% by weight of the same spent nickel catalyst as used in Example 1 at a temperature of 200° to 210° C. under a hydrogen pressure of 1.0 Kg/cm$^2$ to obtain a hardened oil having an iodine value of 58.6, a trans-isomer content of 49.5% by weight and a melting point of 35.6° C. To 1 part by weight of the so obtained hardened oil was added 3 parts by weight of acetone and crystallization was effected at 20° C.

The filtrate portion was recovered by fractionation and then crystallized at 0° C. The filtrate portion was removed by fractionation and the solvent was removed from the residual crystal portion to obtain a fractionated oil having the following characteristics:

Iodine value: 55.6
Trans-isomer content: 47.8% by weight
Melting point: 35.7° C.
Fatty acid contents based on total constituent fatty acids:
Palmitic acid: 30.7% by weight
Stearic acid: 4.8% by weight
Oleic acid: 59.7% by weight The hard butter so obtained was found to have an SFI curve as shown in FIG. 5. The hard butter had an excellent melting property and exhibited a good compatibility with cacao butter in the compatibility test illustrated hereinafter.

EXAMPLE 5

The same palm olein as used in Example 1 was subjected to selective hydrogenation-isomerization in the presence of 0.5% by weight of the same catalyst as used in Example 2 at a temperature of 200° to 210° C. under a hydrogen pressure of 1.0 Kg/cm$^2$ to obtain a hardened oil having an iodine value of 54.3 and a melting point of 36.7° C.

Separately, the same rice bran oil as used in Example 4 was subjected to selective hydrogenation-isomerization in the presence of 0.3% by weight of the same catalyst as used in Example 1 at a temperature of 200° to 210° C. under a hydrogen pressure of 1.0 Kg/cm$^2$ and the hydrogenated isomerized oil was fractionated under the same conditions as described in Example 4 to obtain a fractionated oil having an iodine value of 62.1, a trans-isomer content of 53.6% by weight and a melting point of 35.2° C.

The above-mentioned hardened oil was mixed with the so-obtained fractionated oil at a mixing weight ratio of 40/60 to obtain a mixed oil having the following characteristics:
Iodine value: 58.7
Trans-isomer content: 45.3% by weight
Melting point: 35.8° C.
Fatty acid contents based on total constituent fatty acids:
Palmitic acid: 29.2% by weight
Stearic acid: 4.3% by weight
Oleic acid: 61.8% by weight The hard butter so obtained was found to have an SFI curve as shown in FIG. 4. The hard butter had an excellent melting property and exhibited a good compatibility with cacao butter in the compatibility test described hereinafter.

EXAMPLE 6

The same palm olein as used in Example 2 was subjected to selective hydrogenation-isomerization in the presence of 0.5% by weight of the same catalyst as used in Example 1 at a temperature of 200° to 210° C. under a hydrogen pressure of 1.0 Kg/cm² to obtain a hardened oil having an iodine value of 54.5 and a melting point of 34.3° C. The hardened oil was fractionated under the same conditions as described in Example 4 to obtain a fractionated oil (A) having an iodine value of 52.1 and a melting point of 35.8° C.

Separately, the same soybean oil as used in Example 3 was subjected to hydrogenation-isomerization under the same conditions as described above by using the same catalyst as described above to obtain a hardened oil having an iodine value of 78.4 and a melting point of 33.2° C., and the hardened oil was then fractionated under the same conditions as described above to obtain a fractionated oil (B) having an iodine value of 69.3 and a melting point of 35.0° C.

The fractionated oil (A) was mixed with the fractionated oil (B) at a mixing weight ratio of 15/85 to obtain a mixed oil having the following characteristics:
Iodine value: 67.8
Melting point: 35.2° C.
Fatty acid contents based on total constituent fatty acids:
Palmitic acid: 15.6% by weight
Stearic acid: 6.2% by weight
Oleic acid: 71.8% by weight The hard butter so obtained was found to have an SFI curve as shown in FIG. 5. The hard butter had an excellent melting property and exhibited a good compatibility with cacao butter in the compatibility test described hereinafter.

EXAMPLE 7

The same palm olein as used in Example 2 was subjected to selective hydrogenation-isomerization in the presence of 0.3% by weight of the same catalyst as used in Example 1 at a temperature of 200° to 210° C. under a hydrogen pressure of 1.0 Kg/cm², and the hydrogenated isomerized product was fractionated under the same conditions as described in Example 4 to obtain a fractionated oil (C) having an iodine value of 53.6 and a melting point of 34.2° C.

Separately, rice bran oil having an iodine value of 104.0 was subjected to selective hydrogenation-isomerization in the presence of 0.5% by weight of the same catalyst as described above at a temperature of 200° to 210° C. under a hydrogen pressure of 1.0 Kg/cm² to obtain a hardened oil (D) having an iodine value of 68.7, a trans-isomer content of 56.1% by weight and a melting point of 34.3° C.

The above fractionated oil (C) was mixed with the so obtained hardened oil (D) at a mixing weight ratio of 30/70 to obtain a mixed oil having the following characteristics:
Iodine value: 63.8
Trans-isomer content: 50.1% by weight
Melting point: 34.1° C.
Fatty acid contents based on total constituent fatty acids:
Palmitic acid: 27.4% by weight
Stearic acid: 2.9% by weight
Oleic acid: 66.2% by weight The hard butter so obtained was found to have an SFI curve as shown in FIG. 4. The hard butter had an excellent melting property and exhibited a good compatibility with cacao butter in the compatibility test described hereinafter.

EXAMPLE 8

The same palm olein as used in Example 2 was subjected to selective hydrogenation-isomerization in the presence of 0.5% by weight of the same catalyst as used in Example 2 at a temperature of 200° to 210° C. under a hydrogen pressure of 1.0 Kg/cm² to obtain a hardened oil having an iodine value of 53.8 and a melting point of 37.7° C.

Separately, the same soybean oil as used in Example 3 was subjected to selective hydrogenation-isomerization in the presence of 0.3% by weight of the same catalyst as used in Example 1 at a temperature of 200° to 210° C. under a hydrogen pressure of 1.5 Kg/cm², and the hydrogenated-isomerized product was fractionated under the same conditions as described in Example 4 to obtain a fractionated oil having an iodine value of 67.3 and a melting point of 35.5° C.

The above hardened oil was mixed with the so obtained fractionated oil at a mixing weight ratio of 80/20 to obtain a mixed oil having the following characteristics:
Iodine value: 56.7
Trans-isomer content: 43.6% by weight
Melting point: 37.3° C.
Fatty acid contents based on total constituent fatty acids:
Palmitic acid: 33.0% by weight
Stearic acid: 2.8% by weight
Oleic acid: 58.3% by weight The hard butter so obtained was found to have an SFI curve as shown in FIG. 5. The hard butter had an excellent melting property and exhibited a good compatibility with cacao butter in the compatibility test described hereinafter.

COMPARATIVE EXAMPLE 1

Rapeseed oil having an iodine value of 116.2 was subjected to selective hydrogenation-isomerization by using the same spent nickel catalyst as used in Example 1 under the same conditions as described in Example 1 to obtain a hardened oil having the following characteristics:
Iodine value: 75.0
Trans-isomer content: 61.6% by weight Melting point: 36.1° C.
Fatty acid contents based on total constituent fatty acids:
Palmitic acid: 4.7% by weight
Stearic acid: 7.7% by weight
Oleic acid: 82.9% by weight The hard butter so obtained was found to have an SFI curve as shown in FIG. 4. In the compatibility test of this hard butter, results as shown below in the Referential Example were obtained.

COMPARATIVE EXAMPLE 2

Soybean oil having an iodine value of 129.5 was subjected to selective hydrogenation-isomerization by using the same catalyst as used in Example 1 under the same conditions as described in Example 1 to obtain a hardened oil having an iodine value of 78.6 a trans-isomer content of 61.3% by weight and a melting point of 32.8° C. The hardened oil was then fractionated under the same conditions as described in Example 3 to obtain a hard butter having the following characteristics:
Iodine value: 69.9
Trans-isomer content: 62.8% by weight
Melting point: 35.1° C.
Fatty acid contents based on total constituent fatty acids:
Palmitic acid: 11.7% by weight
Stearic acid: 6.6% by weight
Oleic acid: 74.6% by weight The hard butter so obtained was found to have an SFI curve as shown in FIG. 5. In the compatibility test of this hard butter, results shown in the following Referential Example were obtained.

REFERENTIAL EXAMPLE

In order to determine the compatibility of each the hard butters obtained in Examples 1 to 8 and Comparative Examples 1 and 2 with cacao butter, chocolates were prepared by using these hard butters and the hardness was examined with respect to each chocolate.

A chocolate base comprising 50% by weight of powdered sugar, 10% by weight of cocoa mass, 10% by weight of cocoa cake (having an oil content of 12 to 14% by weight), 30% by weight of a hard butter and 0.3% by weight of lecithin was prepared and molded without a tempering process. The molded chocolate was allowed to stand still at 28° C. for 4 hours and the hardness (penetration) was measured by a cone penetrometer to obtain results shown in Table 1.

Table 1

| Hard Butter Used | Penetration (mm/10) |
| --- | --- |
| Product of Example 1 | 24 |
| Product of Example 2 | 26 |
| Product of Example 3 | 36 |
| Product of Example 4 | 30 |
| Product of Example 5 | 32 |
| Product of Example 6 | 33 |
| Product of Example 7 | 32 |
| Product of Example 8 | 26 |
| Product of Comparative Example 1 | 35 |
| Product of Comparative Example 2 | 51 |

The gradient of the SFI curve of the hard butter of Comparative Example 1 which was prepared by hydrogenation-isomerization alone is more gentle than the gradients of the SFI curves of the hard butters of Examples 1 and 2, each of which was prepared by hydrogenation-isomerization alone, and hence, it is seen that the hard butter of Comparative Example 1 was inferior to the hard butters of Examples 1 and 2 with respect to the sharp mouth-melting property required of hard butters.

The SFI curve of the hard butter of Comparative Example 1 which was prepared by hydrogenation-isomerization and subsequent fractionation is not substantially different from those of the hard butters of Examples 3, 4 and 6, each of which was prepared by hydrogenation-isomerization and subsequent fractionation, but when it was incorporated into the chocolate base, because of poor compatibility with cacao butter, softening phenomenon took place and the hardness required of chocolate could not be obtained.

What we claim is:

1. A hard butter consisting essentially of (a) 10 to 90% by weight of a first hardened oil obtained by hydrogenating and isomerizing palm olein which has an iodine value of at least 55 and is substantially free of tri-saturated glycerides, a first oil fraction obtained by fractionating said first hardened oil and removing low melting and/or high melting substances therefrom, or mixtures of said first hardened oil and said first oil fraction, and (b) 90 to 10% by weight of a second hardened oil obtained by hydrogenating and isomerizing a vegetable oil or fat other than palm oil, said vegetable oil or fat being substantially free of tri-saturated glycerides and having a linoleic acid content of 30 to 55% by weight, based on the total constituent fatty acids, a second oil fraction obtained by fractionating said second hardened oil and removing low melting and/or high melting substances therefrom, or mixtures of said second hardened oil and said second oil fraction, wherein the iodine value of said hard butter is 50 to 75, the trans-isomer content of said hard butter is at least 25% by weight, the palmitic acid content of said hard butter is 15 to 40% by weight based on the total consitutent fatty acids, the stearic acid content of said hard butter is 2 to 10% by weight based on the total constituent fatty acids and the oleic acid content of said hard butter is 55 to 75% by weight based on the total constituent fatty acids.

2. A hard butter consisting essentially of an oil or fat having an iodine value of 55 to 70, a trans-isomer content of at least 35% by weight, a palmitic acid content of 15 to 40% by weight based on the total constituent fatty acids, a stearic acid content of 2 to 10% based on the total constituent fatty acids and an oleic acid content of 55 to 75% by weight based on the total constituent fatty acids, said oil or fat being obtained by the process consisting essentially of selectively hydrogenating and isomerizing a mixture of (a) palm olein which has an iodine value of at least 55 and is substantially free of tri-saturated glyceride and (b) vegetable oil or fat other than palm oil, said vegetable oil or fat being substantially free of tri-saturated glycerides and having a linoleic acid content of 30 to 55% by weight based on the total constituent fatty acids, wherein the mixing ratio of (a):(b) is in the range within the hatched area of FIG. 1.

3. A hard butter consisting essentially of an oil or fat having an iodine value of 55 to 70, a trans-isomer content of at least 35% by weight, a palmitic acid content of 15 to 40% by weight based on the total constituent fatty acids, a stearic acid content of 2 to 10% by weight based on the total constituent fatty acids and an oleic acid content of 55 to 75% by weight based on the total constituent fatty acids, said oil or fat being obtained by the process consisting essentially of the steps of selectively hydrogenating and isomerizing a mixture of (a) palm olein which has an iodine value of at least 55 and is substantially free of tri-saturated glycerides and (b) vegetable oil or fat other than palm oil, said vegetable oil or fat being substantially free of tri-saturated glycerides and having a linoleic acid content of 30 to 55% by weight based on the total constituent fatty acids, wherein the mixing ratio of (a):(b) is in the range within the hatched area of FIG. 2, and then fractionating the resulting hydrogenated isomerized product to remove therefrom low-melting substances and high-melting substances.

4. A hard butter consisting essentially of an oil or fat having an iodine value of 50 to 70, a trans-isomer content of at least 25% by weight, a palmitic acid content of 20 to 40% by weight based on the total constituent fatty acids, a stearic acid content of 2 to 10% by weight based on the total constituent fatty acids and an oleic acid content of 55 to 70% by weight based on the total constituent fatty acids, said oil or fat being obtained by the process consisting essentially of the step of mixing (a) first hardened oil obtained by hydrogenating and isomerizing a palm olein which has an iodine value of at least 55 and is substantially free of tri-saturated glycerides and (b) second hardened oil obtained by selectively hydrogenating and isomerizing a vegetable oil or fat other than palm oil, said vegetable oil or fat being substantially free of tri-saturated glycerides and having a linoleic acid content of 30 to 55% by weight based on the total constituent fatty acids, wherein the mixing ratio of (a):(b) is in the range within the hatched area in FIG. 3, and then fractionating the resulting mixture to remove therefrom low-melting substances and high-melting substances.

5. A hard butter as claimed in claim 1, in which the hydrogenation-isomerization is carried out in the presence of a hydrogenation catalyst.

6. A hard butter as claimed in claim 5, in which the catalyst is nickel.

7. A hard butter as claimed in claim 5, in which the amount of catalyst present is from 0.1 to 2% by weight based on the weight of the oil or fat components.

8. A hard butter as claimed in claim 5, in which the hydrogenation is conducted at a temperature of 160° to 220° C. under a hydrogen pressure of up to 3 Kg/cm$^2$.

9. A hard butter as claimed in claim 1, in which said palm olein is the material obtained by removing higher melting components including tri-saturated glycerides from palm oil.

* * * * *